United States Patent
Goto

[11] 4,126,377
[45] Nov. 21, 1978

[54] ZOOM OPTICAL SYSTEM FOR MICROSCOPES

[75] Inventor: Astuo Goto, Tachikawa, Japan

[73] Assignee: Olympus Optical Co., Ltd., Tokyo, Japan

[21] Appl. No.: 771,802

[22] Filed: Feb. 24, 1977

[30] Foreign Application Priority Data
Feb. 27, 1976 [JP] Japan .................................. 51-20146

[51] Int. Cl.$^2$ .............................................. G02B 15/14
[52] U.S. Cl. ............................. 350/184; 350/175 ML
[58] Field of Search ................. 350/175 ML, 184, 186

[56] References Cited
U.S. PATENT DOCUMENTS

| | | | |
|---|---|---|---|
| 3,063,341 | 11/1962 | Beck | 350/184 |
| 3,502,392 | 3/1970 | Muller | 350/184 |
| 3,679,286 | 7/1972 | Klein | 350/184 |

*Primary Examiner*—Paul A. Sacher
*Attorney, Agent, or Firm*—Cushman, Darby & Cushman

[57] ABSTRACT

An optical compensation type zoom optical system for microscopes comprising a first through fourth lens groups, and is so adapted as to displace said first and third lens groups for zooming while said second and fourth lens groups are kept fixed, said optical system being so designed as to assure little deviation of image planes during zooming operation and favorably correct various aberrations.

1 Claim, 11 Drawing Figures

FIG. 2A
SPHERICAL ABERRATION
FIG. 2B
ASTIGMATISM
FIG. 2C
DISTORTION
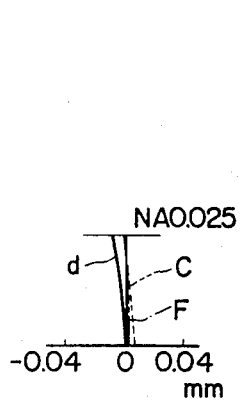
FIG. 3A
SPHERICAL ABERRATION
FIG. 3B
ASTIGMATISM
FIG. 3C
DISTORTION
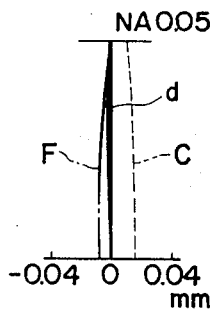
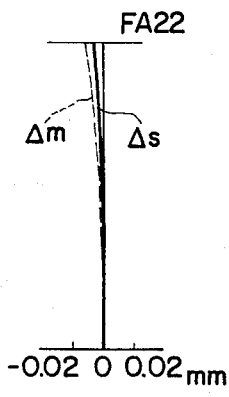
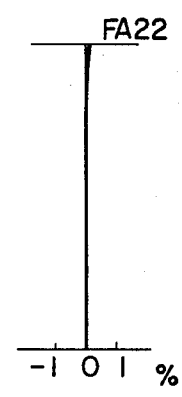
FIG. 4A
SPHERICAL ABERRATION
FIG. 4B
ASTIGMATISM
FIG. 4C
DISTORTION
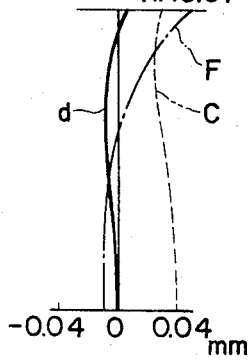
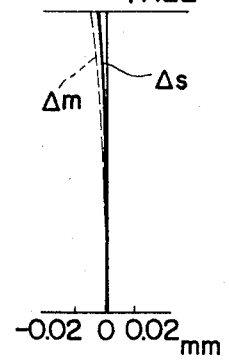
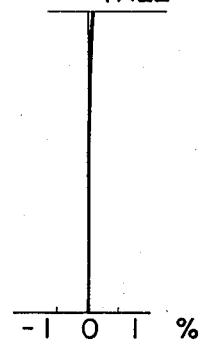

ZOOM OPTICAL SYSTEM FOR MICROSCOPES

BACKGROUND OF THE INVENTION (a) Field of the invention

The present invention relates to a zoom optical system for microscopes and, more specifically to a zoom mechanism of optical compensation type.

(b) Description of the prior art

As microscopes equipped with zoom mechanisms, there have conventionally been known binocular stereoscopic microscopes which use zoom mechanisms of mechanical compensation type. Since such mechanical compensation type zoom mechanism use cams of very high precision which requires very tedious procedures for manufacturing, zoom lens systems adopting such compensation mechanisms require very high manufacturing cost.

SUMMARY OF THE INVENTION

A general object of the present invention is to provide an optical compensation type zoom optical system for microscopes which has a zoom ratio of approximately 4 and wherein aberrations are favourably corrected.

The optical system according to the present invention has such a composition as shown in FIG. 1, and comprises four lens groups: a first lens group $L_1$ having positive power, a second lens group $L_2$ having negative power, a third lens group $L_3$ having positive power and a fourth lens group $L_4$ having negative power. The optical system according to the present invention is a zoom optical system which is so adapted as to permit zooming by displacing the first lens group $L_1$ and the third lens group $L_3$ as a unit along the optical axis while the second lens group $L_2$ and fourth lens group $L_4$ are kept fixed. In such an optical compensation type zoom optical system comprising four lens groups, image planes are coincident at four points within its zooming range, and it is possible for such an optical system to reduce deviation of image planes to a practically negligible degree when the optical system is used as a binocular stereoscopic microscope.

In addition to the adoption of the afore-mentioned optical compensation type zoom mechanism, the zoom optical system according to the present invention is so composed as described below for favourably correcting various aberrations. That is to say, the first lens group $L_1$ having positive power consists of a positive cemented doublet lens having cemented surface of negative refracting power and a single positive lens having a convex surface on the object side, the second lens group $L_2$ having negative power consists of a negative cemented doublet lens having cemented surface of positive refracting power and a negative single lens, the third lens group $L_3$ consists of a positive cemented doublet lens, and the fourth lens group $L_4$ consists of a negative cemented doublet lens. The optical lens system according to the present invention is characterized in that it satisfies the following conditions:

$$n_1 - n_2 > 0.1 \quad (1)$$

$$\nu_2 - \nu_1 \geq 27$$

$$1.25 > r_4/r_2 > 0.85 \quad (2)$$

$$\nu_5 - \nu_4 > 27 \quad (3)$$

$$0.6 > (n_5 - n_4/r_7)F_1 > 0.05$$

wherein the reference symbols represent as defined below: $n_1$, $n_2$, $n_4$ and $n_5$: Refractive indices of the respective lens elements of the cemented doublet lens in the first lens group $L_1$, and respective lens elements of the cemented doublet lens in the second lens group $L_2$.

$\nu_1$, $\nu_2$, $\nu_4$, and $\nu_5$: Abbe's numbers of the respective lens elements of the afore-mentioned cemented lenses.

$r_2$, $r_4$, and $r_7$: Radii of curvature on the cemented surface of the cemented doublet lens in the first lens group $L_1$, object side surface of the positive lens in the first lens group $L_1$ and the cemented surface of the cemented doublet lens in the second lens group $L_2$.

$F_1$: Total focal length of the first lens group $L_1$ as a whole.

Now, significance of the afore-mentioned conditions will be described consecutively below:

In order to favourably correct chromatic aberration in a zoom optical system condidered as a whole, it is required to correct it independently in each of the lens groups. The conditions (1) and (2) are adopted for correcting chromatic aberration in the first lens group $L_1$. The first lens group $L_1$ gives large influence on chromatic aberration when the optical system is set at high magnification levels. When glass materials of both the lens elements of the positive cemented doublet lens in the first lens groups $L_1$ have refractive indices and Abbe's numbers which are deviated from the ranges defined by the condition (1), it will be difficult to correct chromatic aberration. For correcting chromatic aberration by adopting such refractive indices and Abbe's numbers, it will be required to reduce the radius of curvature $r_2$ on the cemented surface. If radius of curvature $r_2$ is reduced, however, spherical aberration will be overcorrected and, in addition, coma will be aggravated too much to be corrected by the other lens groups. Even when the first lens group $L_1$ is so designed as to satisfy the condition (1) to correct chromatic aberration without producing aberrations such as spherical aberration, the condition (2) is necessary for correcting spherical aberration overcorrected by the surface $r_2$. When the upper limit of the condition (2) is exceeded $(r_4/r_2 > 1.25)$, it will be impossible to design the surface $r_4$ so as to correct the spherical aberration which is overcorrected by the surface $r_2$. If $r_4/r_2$ is smaller than the lower limit of the condition (2) $(r_4/r_2 < 0.85)$, in contrast, the surface $r_4$ will correct spherical aberration too much, thereby resulting in undercorrection of spherical aberration.

The condition (3) is required for correcting chromatic aberration in the second lens group $L_2$. Since the second lens group $L_2$ comprises a negative cemented lens, it overcorrects spherical aberration and chromatic aberration. When $\nu_5 - \nu_4$ is smaller than 27 $(\nu_5 - \nu_4 < 27)$, it will be impossible to favourably correct chromatic aberration. If $(n5 - n4/r_7) F_1$ exceeds the upper limit of the condition (3) $[(n5 - n4/r_7) > 0.6]$, spherical aberration will be undercorrected at high magnification levels. if $(n5 - n4/r_7) F_1$ is smaller than the lower limit of the condition (3) $[(n5 - n4/r_7) F_1 < 0.5]$, in contrast, spherical aberration will be overcorrected.

Furthermore, the positive cemented doublet lens in the third lens group $L_3$ should preferably have a convex surface on the object side for making it possible to favourably correct astigmatism. In addition, spherical aberration at low magnification levels can be corrected more favourably by adopting a meniscus lens having a concave surface on the object side as the negative cemented doublet lens in the fourth lens group $L_4$.

BRIEF DESCRIPTION OF THE DRAWINGS

FIG. 2 through FIG. 2C show curves illustrating the aberration characteristics at a magnification level of 1x of the Embodiment;

FIG. 3A through FIG. 3C illustrate graphs showing the aberration characteristics at a magnification level of 2x of the Embodiment;

FIG. 4A through FIG. 4C illustrate graphs showing the aberration characteristics at a magnification level of 4x of the Embodiment.

DETAILED DESCRIPTION OF THE PREFERRED EMBODIMENT

A preferred embodiment of the present invention will be described below by clarifying numerical data:

Embodiment:

$r_1 = -1.9448$
 $d_1 = 0.0404$    $n_1 = 1.69895$   $\nu_1 = 30.1$
$r_2 = 0.6507$
 $d_2 = 0.0808$    $n_2 = 1.55963$   $\nu_2 = 61.1$
$r_3 = -0.7185$
 $d_3 = 0.0112$
$r_4 = 0.6871$
 $d_4 = 0.0628$    $n_3 = 1.70154$   $\nu_3 = 41.1$
$r_5 = 2.3828$
 $d_5 = l_2$
$r_6 = -0.9683$
 $d_6 = 0.0404$    $n_4 = 1.68893$   $\nu_4 = 31.1$
$r_7 = -0.3230$
 $d_7 = 0.0269$    $n_5 = 1.50977$   $\nu_5 = 62.1$
$r_8 = -3.6830$
 $d_8 = 0.0337$
$r_9 = -0.5326$
 $d_9 = 0.0269$    $n_6 = 1.56384$   $\nu_6 = 60.8$
$r_{10} = 0.9393$
 $d_{10} = l_3$
$r_{11} = 1.0265$
 $d_{11} = 0.0337$  $n_7 = 1.72151$   $\nu_7 = 29.2$
$r_{12} = 0.4939$
 $d_{12} = 0.0718$  $n_8 = 1.51454$   $\nu_8 = 54.7$
$r_{13} = -0.7043$
 $d_{13} = l_4$
$r_{14} = -0.7612$
 $d_{14} = 0.0337$  $n_9 = 1.62012$   $\nu_9 = 49.7$
$r_{15} = \infty$
 $d_{15} = 0.0561$  $n_{10} = 1.62280$ $\nu_{10} = 57.1$
$r_{16} = -1.0682$
 $\beta = 1x - 4x$
 $F_I = 1$,        $F_{II} = -0.585$,
 $F_{III} = 1$,    $F_{IV} = -4.871$,

| Magnification | $l_1$ | $d_5 = l_2$ | $d_{10} = l_3$ | $d_{13} = l_4$ |
|---|---|---|---|---|
| 1 x | 2.7428 | 0.1043 | 0.6905 | 0.0990 |
| 2 x | 2.4363 | 0.4108 | 0.3840 | 0.4055 |
| 4 x | 2.1298 | 0.7173 | 0.0775 | 0.7120 |

Wherein the reference symbols $r_1$ through $r_{16}$ represent radii of curvature on the respective lens surfaces, the reference symbols $d_1$ through $d_{15}$ designate thickness of the respective lens elements and airspaces therebetween, the reference symbols $n_1$ through $n_{20}$ denote refractive indices of the respective lens elements, the reference symbols $\nu_1$ through $\nu_{10}$ represent Abbe's numbers of the respective lens elements, the reference symbol $l_1$ designates the working distance, the reference symbols $F_I$ through $F_{IV}$ denote focal lengths of the first lens grou $L_1$ through fourth lens group $L_4$. In addition, the afore-mentioned numerical data are given on the assumption that the focal length of the first lens group $L_1$ is taken as 1.

Figure 1:
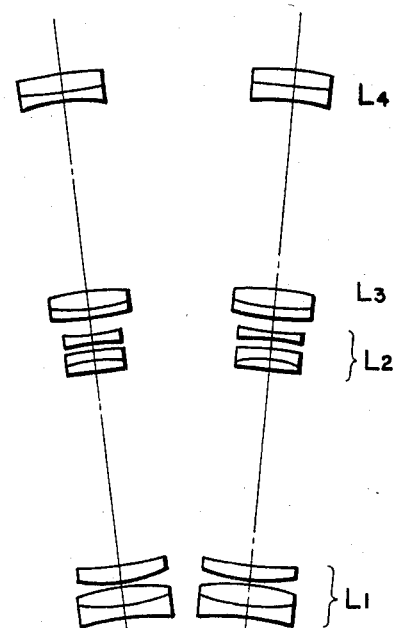
FIG. 1 shows a sectional view illustrating the composition of the zoom optical system according to the present invention.
Figure 5:
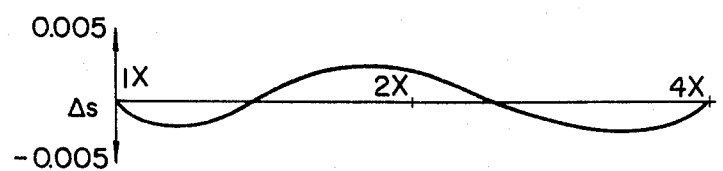
FIG. 5 shows a curve illustrating deviation of images while magnification of the optical system is changed in the Embodiment.

As is clearly understood from the foregoing descriptions, the present invention provides a zoom optical system which has relatively simple optical composition, simple mechanical structure using the optical compensation system which does not require a high-precision cam and can be manufactured at low cost. Further, deviation of image planes are corrected at four points as shown in FIG. 5 within such narrow ranges as are negligible in practical use. Furthermore, various aberrations are favourably corrected to such degrees as are similar to those obtainable in mechanical compensation type zoom lens systems.

Though cemented doublet lenses having concave surfaces on the object side are used in the first lens group $L_1$ and the second lens group $L_2$ in the afore-mentioned Embodiment, it is possible to design the cemented doublet lenses so as to have convex surface on the object side. Though the accompanying drawings illustrate an zoom optical system for binocular stereoscopic microscopes, it is needless to say that the presnet invention is applicable to manufacturing zoom optical system having a single lens system for use in ordinary type microscopes.

I claim:

1. A zoom optical system for microscopes comprising a first lens group consisting of a positive cemented doublet lens having a cemented surface of negative refractive power and a positive lens having a convex surface on the object side, a second lens group consisting of a negative cemented doublet lens having cemented surface of positive refractive power and a negative lens, a thrid lens group consisting of a positive cemented lens, and a fourth lens group consisting of a negative cemented doublet lens, and being adapted in such a way that said first and third lens groups are movable as a unit for zooming while said second and fourth lens groups are kept fixed, said optical system satisfying the following conditions:

$$n_1 - n_2 > 0.1 \quad (1)$$

$$\nu_2 - \nu_1 > 27$$

$$1.25 > r_4/r_3 > 0.85 \quad (2)$$

$$\nu_5 - \nu_4 > 27 \quad (3)$$

$$0.6 > (n_4 - n_4/r_7) F_1 > 0.5$$

Wherein the reference symbols $n_1$ and $n_2$ represent refractive indices of both the lens elements of said cemented doublet lens in the first lens group, the reference symbols $n_4$ and $n_5$ designate refractive indices of both the lens elements of said cemented doublet lens in the second lens group, the reference symbols $\nu_1$ and $\nu_2$ denote Abbe's numbers of both the lens elements of said cemented doublet lens in the first lens group, the reference symbols $\nu_4$ and $\nu_5$ represent Abbe's numbers of both the lens elements of said cemented doublet lens in the second lens group, the reference symbol $r_2$ represents radius of curvature on the cemented surface of the cemented doublet lens in the first lens group, the reference symbol $r_4$ designates radius of curvature on the object side surface of said single lens element in the first lens group, the reference symbol $r_7$ denotes radius of curvature on the cemented surface of said cemented doublet lens in the second lens group and the referency symbol $F_I$ represents total focal length of first lens group as a whole, said system having the following numerical data:

$r_1 = -1.9448$
$\quad d_1 = 0.0404 \quad n_1 = 1.69895 \quad \nu_1 = 30.1$
$r_2 = 0.6507$
$\quad d_2 = 0.0808 \quad n_2 = 1.55963 \quad \nu_2 = 61.1$
$r_3 = -0.7185$
$\quad d_3 = 0.0112$
$r_4 = 0.6871$
$\quad d_4 = 0.0628 \quad n_3 = 1.70154 \quad \nu_3 = 41.1$
$r_5 = 2.3828$
$\quad d_5 = l_2$
$r_6 = -0.9683$
$\quad d_6 = 0.0404 \quad n_4 = 1.68893 \quad \nu_4 = 31.1$
$r_7 = -0.3230$
$\quad d_7 = 0.0269 \quad n_5 = 1.50977 \quad \nu_5 = 62.1$
$r_8 = -3.6830$
$\quad d_8 = 0.0337$
$r_9 = -0.5326$
$\quad d_9 = 0.0269 \quad n_6 = 1.56384 \quad \nu_6 = 60.8$
$r_{10} = 0.9393$
$\quad d_{10} = l_3$
$r_{11} = 1.0265$
$\quad d_{11} = 0.0337 \quad n_7 = 1.72151 \quad \nu_7 = 29.2$
$r_{12} = 0.4939$
$\quad d_{12} = 0.0718 \quad n_8 = 1.51454 \quad \nu_8 = 54.7$
$r_{13} = -0.7043$
$\quad d_{13} = l_4$
$r_{14} = -0.7612$
$\quad d_{14} = 0.0337 \quad n_9 = 1.62012 \quad \nu_9 = 49.7$
$r_{15} = \infty$
$\quad d_{15} = 0.0561 \quad n_{10} = 1.62280 \quad \nu_{10} = 57.1$
$r_{16} = -1.0682$ $\beta = 1x - 4x$
$F_I = 1, \quad F_{II} = -0.585,$
$F_{III} = 1, \quad F_{IV} = -4.871,$

| Magnification | $l_1$ | $d_5 = l_2$ | $d_{10} = l_3$ | $d_{13} = l_4$ |
|---|---|---|---|---|
| 1 x | 2.7428 | 0.1043 | 0.6905 | 0.0990 |
| 2 x | 2.4363 | 0.4108 | 0.3840 | 0.4055 |
| 4 x | 2.1298 | 0.7173 | 0.0775 | 0.7120 |

Wherein the reference symbols $r_1$ through $r_{16}$ represent radii of curvature on the respective lens surfaces, the reference symbols $d_1$ through $d_{15}$ designate thicknesses of the respective lenses and airspaces therebetween, the reference symbols $n_1$ through $n_{10}$ denote refractive indices of the respective lenses, the reference symbols $\nu_1$ through $\nu_{10}$ represent Abbe's numbers of the respective lenses, the reference symbol $l_1$ designates working distance and the reference symbols $F_I$ through $F_{IV}$ denote focal lengths of the first through fourth lens groups respectively.

* * * * *